US009086701B2

(12) United States Patent
Okitsu et al.

(10) Patent No.: US 9,086,701 B2
(45) Date of Patent: Jul. 21, 2015

(54) PRESSURE REDUCING APPARATUS

(75) Inventors: Masayuki Okitsu, Adachi-ku (JP); Naoki Iguma, Moriya (JP); Kenji Tsukamoto, Tsukubamirai (JP)

(73) Assignee: SMC KABUSHIKI KAISHA, Tokyo (JP)

(*) Notice: Subject to any disclaimer, the term of this patent is extended or adjusted under 35 U.S.C. 154(b) by 294 days.

(21) Appl. No.: 13/702,080

(22) PCT Filed: Jun. 15, 2011

(86) PCT No.: PCT/JP2011/064192
§ 371 (c)(1),
(2), (4) Date: Dec. 5, 2012

(87) PCT Pub. No.: WO2011/162270
PCT Pub. Date: Dec. 29, 2011

(65) Prior Publication Data
US 2013/0074956 A1    Mar. 28, 2013

(30) Foreign Application Priority Data
Jun. 24, 2010  (JP) .................................. 2010-144058

(51) Int. Cl.
*G05D 11/00*    (2006.01)
*G05D 16/00*    (2006.01)
*G05D 16/16*    (2006.01)

(52) U.S. Cl.
CPC .............. *G05D 16/00* (2013.01); *G05D 16/163* (2013.01)

(58) Field of Classification Search
USPC ......... 137/116.5, 489, 489.5, 118.06, 505.18, 137/599.09
See application file for complete search history.

(56) References Cited

U.S. PATENT DOCUMENTS

| 3,669,143 | A | * | 6/1972 | Reese | .......................... 137/512.3 |
| 5,595,209 | A | * | 1/1997 | Atkinson et al. | ............ 137/116.5 |
| 5,890,512 | A |   | 4/1999 | Gotthelf et al. | |
| 6,019,121 | A | * | 2/2000 | Uehara | ........................ 137/116.5 |
| 2009/0260699 | A1 | * | 10/2009 | Horiuchi et al. | .......... 137/599.09 |

FOREIGN PATENT DOCUMENTS

CN    101566855 A    10/2009
DE    41 06 474         9/1992
(Continued)

OTHER PUBLICATIONS

Notice of Allowance issued Dec. 10, 2013 in Japanese Patent Application No. 2010-144058 with Partial English Translation.
(Continued)

*Primary Examiner* — Kevin Murphy
*Assistant Examiner* — R. K. Arundale
(74) *Attorney, Agent, or Firm* — Oblon, McClelland, Maier & Neustadt, L.L.P.

(57) ABSTRACT

A pressure reducing apparatus includes a body being equipped with a first side port through which a pressure fluid is supplied and a second side port through which the pressure fluid having been reduced in pressure is discharged. Further, a feedback passage is formed, which establishes communication between the second side port and a third diaphragm chamber that faces toward a pilot valve. Additionally, a pressure fluid that flows through the second side port is introduced through the feedback passage into the third diaphragm chamber, whereby a third diaphragm is pressed upwardly against an elastic force of a second spring into equilibrium.

6 Claims, 7 Drawing Sheets

(56) References Cited

FOREIGN PATENT DOCUMENTS

| | | |
|---|---|---|
| DE | 10 2007 011 127 A1 | 10/2007 |
| JP | 9-185418 A | 7/1997 |
| JP | 10 198433 | 7/1998 |
| JP | 2005-327004 A | 11/2005 |
| JP | 2006-139451 A | 6/2006 |
| JP | 2009-146177 A | 7/2009 |
| JP | 2009-259136 A | 11/2009 |
| WO | WO 98/30944 A1 | 7/1998 |

OTHER PUBLICATIONS

Combined Chinese Office Action and Search Report issued Jul. 18, 2014, in Patent Application No. 201180031244.0 (with English-language translation).

International Search Report Issued Dec. 16, 2011 in PCT/JP11/64192 Filed Jun. 15, 2011.

Office Action issued in German Patent Application No. 112011102092.9 on Dec. 18, 2014.

\* cited by examiner

PRESSURE REDUCING APPARATUS

TECHNICAL FIELD

The present invention relates to a pressure reducing apparatus for reducing pressure of a supplied pressure fluid to a desired pressure and guiding the pressure fluid out.

BACKGROUND ART

In Japanese Laid-Open Patent Publication No. 10-198433, the present applicant has proposed a pressure reducing apparatus through which a pressure fluid supplied from a first side is reduced in pressure to a desired pressure and guided out to a second side. In the case that the pressure fluid is supplied at a desired set pressure from a fluid pressure supply source to a fluid pressure device, the pressure reducing apparatus is disposed between the fluid pressure supply source and the fluid pressure device, whereby the pressure fluid, which is supplied to the first side from the pressure fluid supply source, is reduced in pressure to a desired pressure corresponding to specifications of the fluid pressure device that is connected to the second side, and thereafter, the pressure fluid is supplied to the second side.

SUMMARY OF INVENTION

A general object of the present invention is to provide a pressure reducing apparatus, in which an amount of air consumed by the pressure reducing apparatus can be reduced.

The present invention is characterized by a pressure reducing apparatus having a valve body that controls flow of a pressure fluid introduced from a first side into a backpressure chamber by means of a separating and closing action thereof with respect to a nozzle, and a diaphragm chamber that communicates with the backpressure chamber through a valve member disposed in the valve body, for reducing pressure of the pressure fluid supplied from the first side, to a desired pressure and guiding the pressure fluid out to a second side.

The pressure reducing apparatus includes the valve body, which is disposed between the backpressure chamber and the diaphragm chamber, the valve body being disposed displaceably with respect to the nozzle, a first connection passage that connects the first side and the backpressure chamber, and in which a communication state is switched by the valve body, and a second connection passage that communicates between the second side and the diaphragm chamber.

A flapper of the valve body is disposed on a fluid-supply side of the backpressure chamber, the first connection passage is connected to the fluid-supply side, and the backpressure chamber communicates with the second side via the second connection passage.

According to the present invention, in the pressure reducing apparatus, which reduces the pressure of the pressure fluid and causes the pressure fluid to flow from the first side to the second side, by providing the first connection passage, which connects the first side and the backpressure chamber and in which a communication state is switched by the valve body, and the second connection passage that communicates between the second side and the diaphragm chamber, in the event that a set pressure of the pressure fluid in the second side is not preset beforehand, by means of the valve body, supply of the pressure fluid into the backpressure chamber can be completely interrupted (or blocked). Owing thereto, the pressure fluid is not exhausted to atmosphere. On the other hand, even in the case that the set pressure has been set, the pressure fluid in the backpressure chamber is not exhausted to atmosphere because the pressure fluid in the backpressure chamber flows to the second side through the nozzle, the diaphragm chamber and the second connection passage. As a result, compared to a conventional pressure reducing apparatus, in which pressure fluid that serves as a pilot pressure is exhausted to atmosphere, because the pilot pressure is supplied to the second side and used therein, unnecessary consumption of the pressure fluid can be suppressed, and the consumption amount thereof can be reduced.

The above and other objects features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
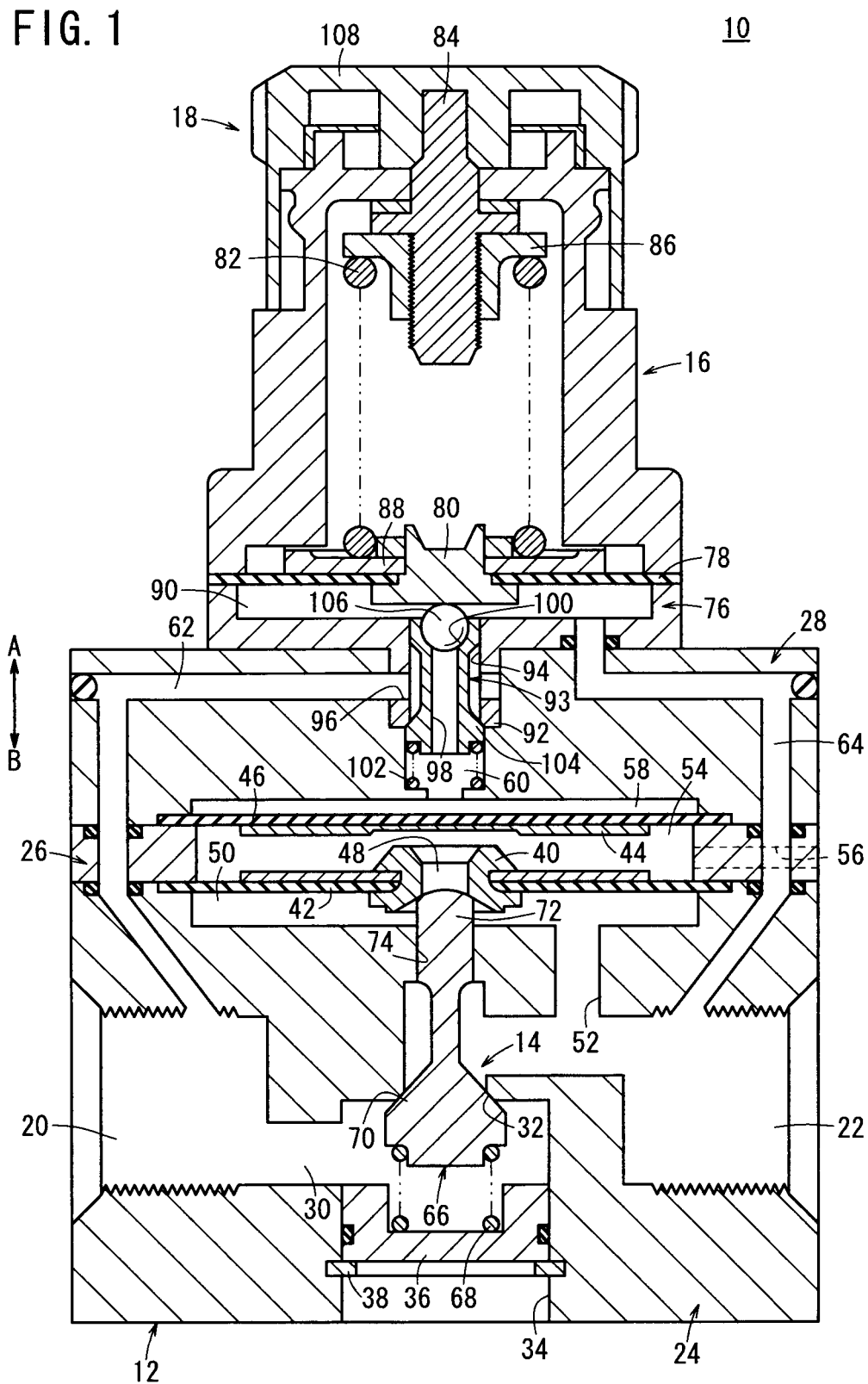
FIG. 1 is an overall cross sectional view of a pressure reducing apparatus according to a first embodiment of the present invention.
Figure 2:
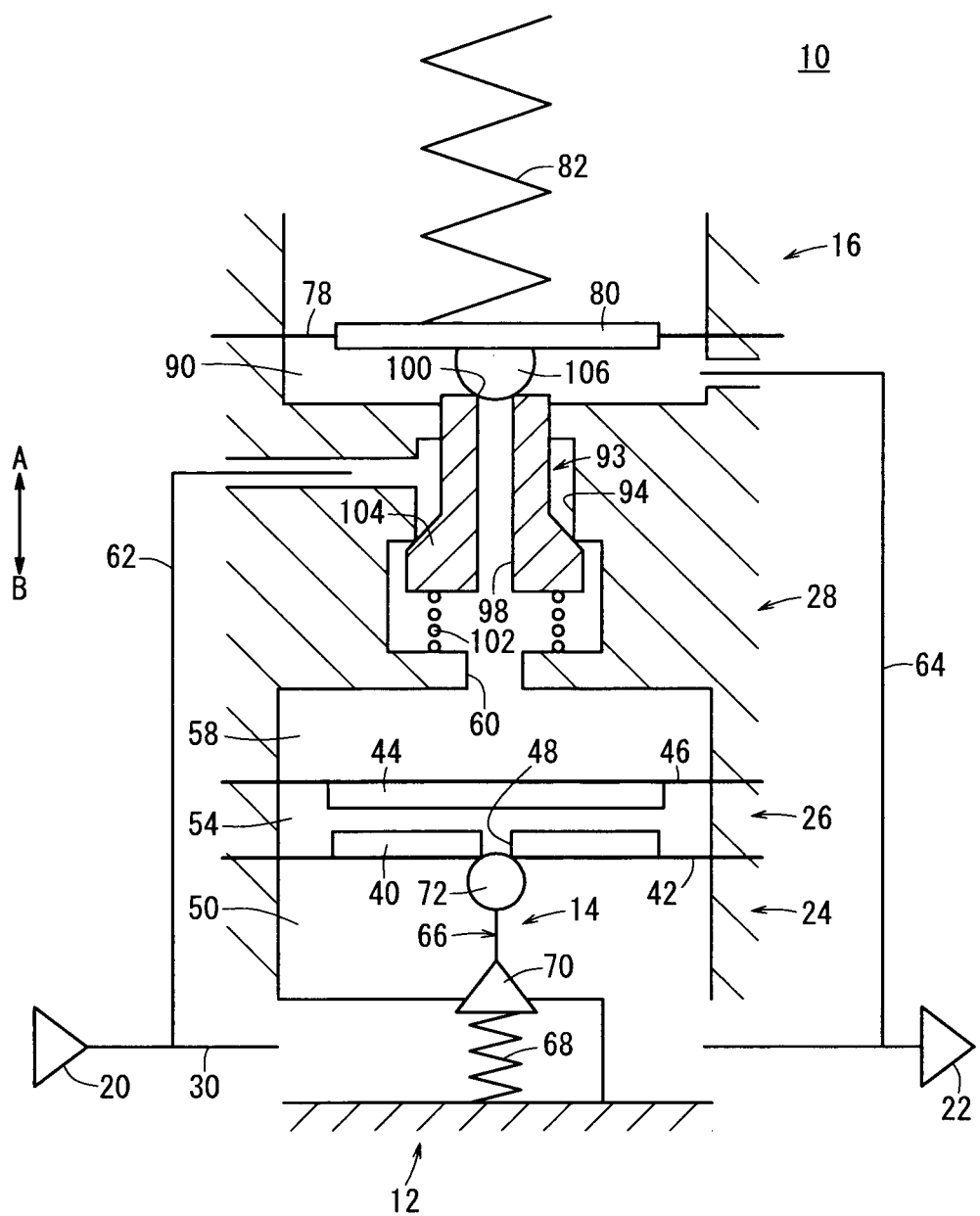
FIG. 2 is a schematic structural view showing the pressure reducing apparatus of FIG. 1.

As shown in FIGS. 1 and 2, the pressure reducing apparatus 10 includes a body 12, a valve mechanism 14 for switching a flow condition of a fluid that flows through the interior of the body 12, a bonnet 16 that is connected to an upper portion of the body 12, and an operating element 18 rotatably disposed on an upper part of the bonnet 16.

The body 12 is made up from a first body 24 having a first side port (first side) 20 and a second side port (second side) 22, a second body 26 arranged on an upper portion of the first body 24, and a third body 28 arranged on an upper portion of the second body 26. The first body 24, the second body 26 and the third body 28 are assembled together integrally by non-illustrated bolts.

The first side port 20 opens on one side surface of the body and is connected to a non-illustrated pressure fluid supply source. The second side port 22 opens on another side surface of the body and is connected to a non-illustrated fluid pressure device. In addition, between the first side port 20 and the second side port 22, a communication passage 30 is formed, which establishes communication between the first side port 20 and the second side port 22. A valve seat 32 on which a later-described main valve 66 can be seated is formed in the interior of the communication passage 30.

Further, on a lower portion of the first body 24, an installation hole 34, which faces and opens downwardly, communicates with the communication passage 30. A closure plug 36 is inserted from below into the installation hole 34 and latched by a latching ring 38. As a result, the installation hole 34 is blocked by the closure plug 36, and communication between the communication passage 30 and the exterior is blocked.

A first diaphragm 42 is disposed between the first body 24 and the second body 26 through a first retaining member 40, which is positioned centrally, whereas a second diaphragm 46 is disposed between the second body 26 and the third body 28 through a plate-shaped second retaining member 44. A hole 48 is formed that penetrates along an axial direction (the direction of arrows A and B) in a central portion of the first retaining member 40.

Additionally, on a lower portion of the first diaphragm 42, a first diaphragm chamber 50 is provided between the first body 24 and the first diaphragm 42, and communicates with the second side port 22 through a communication hole 52 that is formed in the first body 24. Further, a second diaphragm chamber 54 is provided between the first diaphragm 42 and the second diaphragm 46 and communicates with a discharge port 56, which opens on the side of the second body 26. More specifically, the second diaphragm chamber 54 communicates with the exterior through the discharge port 56.

Furthermore, on an upper part of the second diaphragm 46, a nozzle backpressure chamber (backpressure chamber) 58 is formed between the second diaphragm 46 and the third body 28, and communicates with a penetrating hole 60 that penetrates along the axial direction in the center of the third body 28.

On the other hand, in the first through third bodies 24, 26, 28, a bypass passage (first connection passage) 62 is formed in the first side port 20 with respect to the center of the body 12, so as to communicate between the first side port 20 and the penetrating hole 60. In greater detail, the bypass passage 62 is connected to an upper portion of the first side port 20, and after extending upwardly through the first through third bodies 24, 26, 28, bends at a right angle toward a central side in the third body 28 and is connected to the penetrating hole 60.

Further, in the first through third bodies 24, 26, 28, a feedback passage (second connection passage) 64 is formed in the second side port 22 with respect to the center of the body 12, so as to communicate between the second side port 22 and a later-described third diaphragm chamber (diaphragm chamber) 90 of the bonnet 16. In greater detail, the feedback passage 64 is connected to an upper portion of the second side port 22, and after extending upwardly through the first through third bodies 24, 26, 28, bends at a right angle toward a central side in the third body 28, bends further upwardly at a right angle, and is connected to the third diaphragm chamber 90.

The bypass passage 62 and the feedback passage 64 are formed so as not to be in communication with any of the first and second diaphragm chambers 50, 54 and the nozzle backpressure chamber 58.

The valve mechanism 14 is disposed in the communication passage 30 in the first body 24, and includes a main valve 66 that is disposed displaceably along the vertical direction (the direction of arrows A and B), and a first spring 68 that is interposed between the main valve 66 and the closure plug 36.

The main valve 66 comprises a seat member 70, which is disposed upwardly of the closure plug 36 and which has a shape that gradually tapers upwardly, and a sealing member 72 formed upwardly of the seat member 70 and which closes the hole 48 of the first retaining member 40. In the main valve 66, the sealing member 72 is guided displaceably along the axial direction by insertion into a guide hole 74 that penetrates through the center of the first body 24.

The first spring 68 comprises a coil spring, for example, which urges the main valve 66 in a direction (the direction of arrow A) to separate away from the closure plug 36, for thereby seating the seat member 70 with respect to the valve seat 32 of the first body 24.

The bonnet 16 is formed in a cylindrical shape, and is connected to an upper part of the third body 28 through a base member 76 disposed on a lower end of the bonnet 16. A third diaphragm 78 is disposed together with a third retaining member 80 between the bonnet 16 and the base member 76. The third retaining member 80 is disposed in a roughly central portion of the third diaphragm 78. A second spring 82, a rotatable shaft 84, and a spring holder 86 are provided in the interior of the bonnet 16. The second spring 82 comprises a coil spring, and the rotatable shaft 84 and the spring holder 86 constitute the operating element 18.

A disk member 88, in which the third retaining member 80 is fitted, is provided on the upper surface of the third diaphragm 78. An end of the second spring 82 is fixed to an upper part of the disk member 88. The third diaphragm chamber 90 is formed between the third diaphragm 78 and the base member 76, and communicates with the penetrating hole 60 of the third body 28.

The base member 76 is equipped with a nozzle 92, which projects downwardly from a roughly central portion thereof, the nozzle 92 being inserted into the interior of the penetrating hole 60 of the third body 28.

The interior of the nozzle 92 includes a valve hole 94 that penetrates along the axial direction (the direction of arrows A and B) and into which a later-described pilot valve (valve body) 93 is inserted, and a pair of side holes 96, which opens in a direction perpendicular to the valve hole 94. The bypass passage 62 and the valve hole 94 communicate with each other through the side holes 96.

In the interior of the pilot valve 93, a pilot passage 98 is formed that penetrates along the axial direction (the direction of arrows A and B). The pilot valve 93 is displaceable in the axial direction (the direction of arrows A and B) with respect to the valve hole 94 and the penetrating hole 60. At an upper end of the pilot valve 93, there is formed a valve member 100 being recessed with a semispherical shape in cross section, and in which there is retained a spherical body 106 (described later).

Further, a third spring 102 is interposed between a lower end of the pilot valve 93 and the penetrating hole 60, which urges the pilot valve 93 upwardly (in the direction of arrow A). As a result thereof, a flapper 104 of the pilot valve 93 abuts against the bottom end of the nozzle 92, whereby communication between the valve hole 94 and the nozzle backpressure chamber 58 is blocked.

On the other hand, the spherical body 106, which is retained in the valve member 100, functions to close the pilot passage 98, and under the elasticity of the third spring 102, normally abuts against the lower surface of the third retaining member 80.

The operating element 18 is equipped with a rotatable shaft 84, which is screw-engaged in an upper portion of the bonnet 16, and a handle 108 that is fitted into engagement with the rotatable shaft 84. The handle 108 is disposed so as to cover the upper portion of the bonnet 16. Further, on a lower end of the rotatable shaft 84, a spring holder 86 is screw-engaged therewith through a flange, the other end of the second spring 82 being fixed to the spring holder 86. More specifically, the second spring 82 is interposed between the spring holder 86 and the disk member 88 in the interior of the bonnet 16, and serves to urge the spring holder 86 and the disk member 88 mutually in directions away from each other.

Additionally, by rotating the handle 108, the rotatable shaft 84 is rotated integrally therewith, whereupon the spring holder 86, which is screw-engaged on the rotatable shaft 84, is displaced along the axial direction. As a result thereof, for example, the second spring 82 is compressed via the spring holder 86, and the pressing force thereof is applied to (i.e., biases) the third diaphragm 78.

The pressure reducing apparatus 10 according to the first embodiment of the present invention is constructed basically as described above. Next, operations and advantages of the pressure reducing apparatus 10 shall be described.

First, a pressure fluid supply source (not shown) is connected to the first side port 20 through a non-illustrated tube, and a desired fluid pressure device such as a cylinder or the like, for example, is connected to the second side port 22. A pressure fluid is supplied to the first side port 20 from the non-illustrated pressure fluid supply source.

After the above preparatory operations, an operator rotates the handle 108 that constitutes the operating element 18 in a desired direction. By causing the spring holder 86 to descend downwardly, the second spring 82 is compressed, whereby the disk member 88 and the third diaphragm 78 are pressed downwardly at a predetermined pressure (set pressure) by the elastic force of the second spring 82. As a result of the third diaphragm 78 being pressed downwardly, the pilot valve 93 descends in opposition to the elastic force of the third spring 102, and the flapper 104 is made to separate away from the lower end of the nozzle 92. Owing thereto, the pressure fluid, which flows through the bypass passage 62, passes through the penetrating hole 60 and is supplied to the nozzle backpressure chamber 58.

In addition, the pressure (nozzle backpressure) in the nozzle backpressure chamber 58 is raised, the second diaphragm 46 is pressed downwardly by such pressure, and along therewith, the first diaphragm 42 is pressed downwardly, and the main valve 66 descends via the first retaining member 40 in opposition to the elastic force of the first spring 68. As a result, the seat member 70 of the main valve 66 separates away from the valve seat 32 of the first body 24, thereby placing the first side port 20 and the second side port 22 in communication. Owing thereto, pressure fluid supplied to the first side port 20 flows through the communication passage 30 to the second side port 22.

At this time, a portion of the pressure fluid that flows in the second side port 22 flows to the third diaphragm chamber 90 through the feedback passage 64, and the pressure in the third diaphragm chamber 90 is raised. Along therewith, the third diaphragm 78 is pressed and displaced upwardly in opposition to the pressing force of the second spring 82. Owing thereto, the pilot valve 93 is displaced upwardly by the elastic force of the third spring 102.

In addition, when the pressure of the third diaphragm chamber 90 and the pressing force of the second spring 82 are brought into equilibrium, the flapper 104 of the pilot valve 93 is seated with respect to the bottom end of the nozzle 92, and flow of the pressure fluid with respect to the nozzle backpressure chamber 58 is blocked. The pressure fluid, which has been adjusted in pressure to the set pressure regulated by the handle 108, flows to the second side port 22 and is supplied to a non-illustrated fluid pressure device.

On the other hand, when the pressure in the second side port 22 rises above the set pressure which is set based on the rotation angle (rotation number) of the handle 108, the pressure fluid, which has risen in pressure, flows through the feedback passage 64 into the third diaphragm chamber 90, and presses and displaces the third diaphragm 78 further upwardly (in the direction of arrow A) in opposition to the elastic force of the second spring 82. At the same time, because the pressure of the pressure fluid in the nozzle backpressure chamber 58 and the pilot passage 98 is higher than the pressure of the pressure fluid in the third diaphragm chamber 90, the pressure difference (differential pressure) causes the spherical body 106 to be pressed upwardly away from the valve member 100.

As a result, the pilot passage 98 and the third diaphragm chamber 90 are brought into communication, and the pressure fluid inside the nozzle backpressure chamber 58 flows through the pilot passage 98 into the third diaphragm chamber 90, whereupon the pressure in the nozzle backpressure chamber 58 is lowered. The spherical body 106 and the valve member 100 function as a nozzle flapper mechanism.

By lowering the nozzle backpressure, the first diaphragm 42 and the second diaphragm 46 are displaced upwardly, accompanied by the sealing member 72 of the main valve 66 separating away from the first retaining member 40. Together therewith, the main valve 66 is raised under the elasticity of the first spring 68, whereupon the seat member 70 is seated on the valve seat 32. Accordingly, the hole 48 of the first retaining member 40, which was closed by the sealing member 72 of the main valve 66, opens, and the pressure fluid, the pressure of which has risen in the second side port 22, is introduced into the second diaphragm chamber 54 via the hole 48, and is exhausted to atmosphere through the discharge port 56.

In the foregoing manner, according to the first embodiment, the feedback passage 64 is provided, which establishes communication between the second side port 22 and the third diaphragm chamber 90, and together therewith, a configuration is provided such that, when the pressure fluid flows from the first side port 20 to the second side port 22, the pressure fluid supplied to the nozzle backpressure chamber 58 is capable of flowing through the feedback passage 64 to the second side port 22 without being discharged to the exterior.

Owing to the above-described configuration, in the case that the second side pressure (set pressure) is not set beforehand in the second side port 22, the flapper 104 of the pilot valve 93 is seated on the lower end of the nozzle 92, and supply of pressure fluid to the nozzle backpressure chamber 58 is completely blocked. Therefore, the pressure fluid that forms the pilot pressure is not exhausted to atmosphere. Further, even in the case that the second side pressure (set pressure) of the pressure fluid in the second side port 22 is set, and such pressure is adjusted in pressure by the operating element 18, because the pressure fluid in the nozzle backpressure chamber 58 flows to the second side port 22 through the pilot passage 98 and the third diaphragm chamber 90, the pressure fluid is not exhausted to atmosphere. As a result, compared to a conventional pressure reducing apparatus, in which pressure fluid that serves as a pilot pressure is exhausted to atmosphere, because the pilot pressure can be supplied to the second side port 22, unnecessary consumption of the pressure fluid can be suppressed, and the consumption amount thereof can effectively be reduced.

Figure 3:
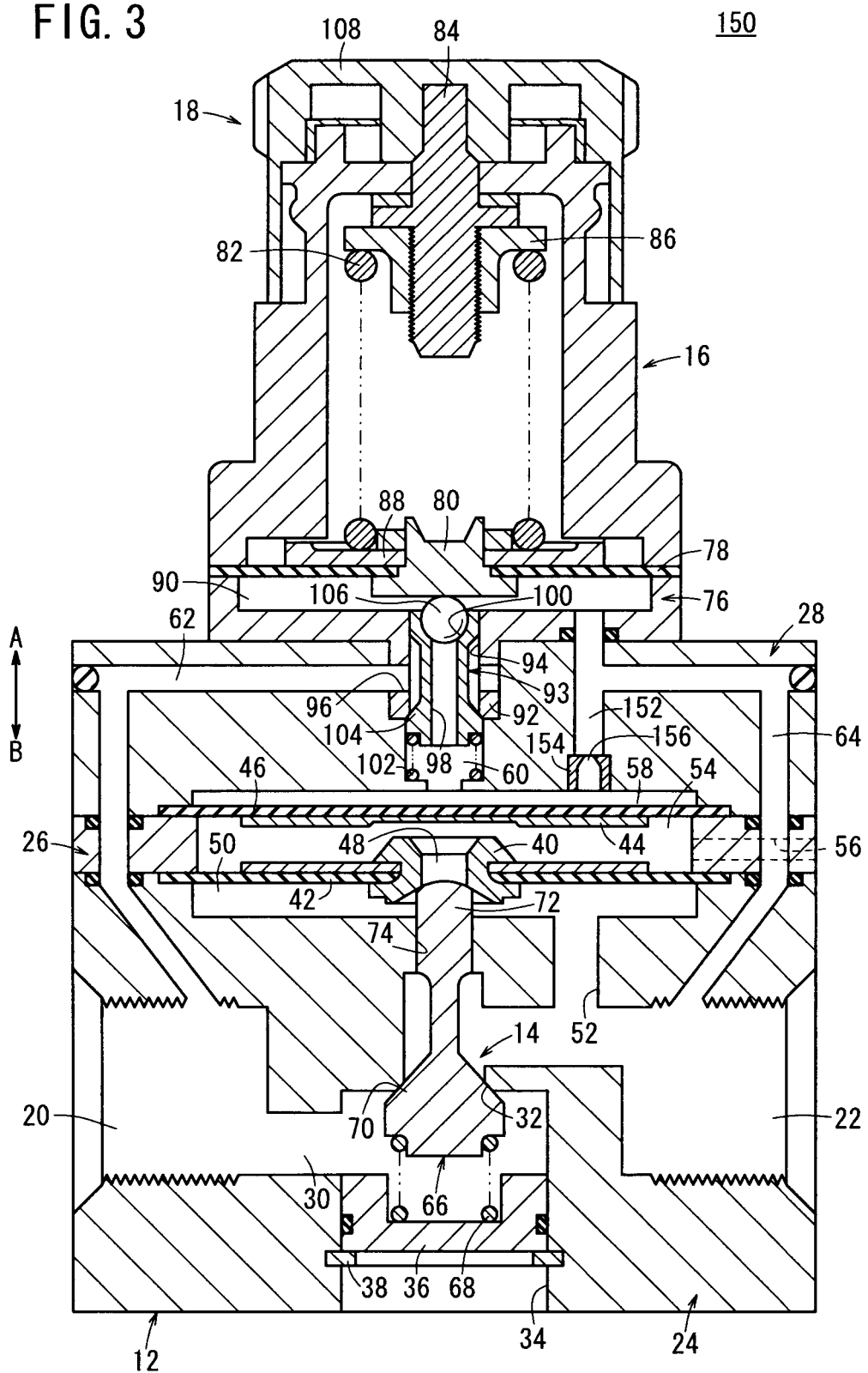
FIG. 3 is an overall cross sectional view of a pressure reducing apparatus according to a second embodiment of the present invention.
Figure 4:
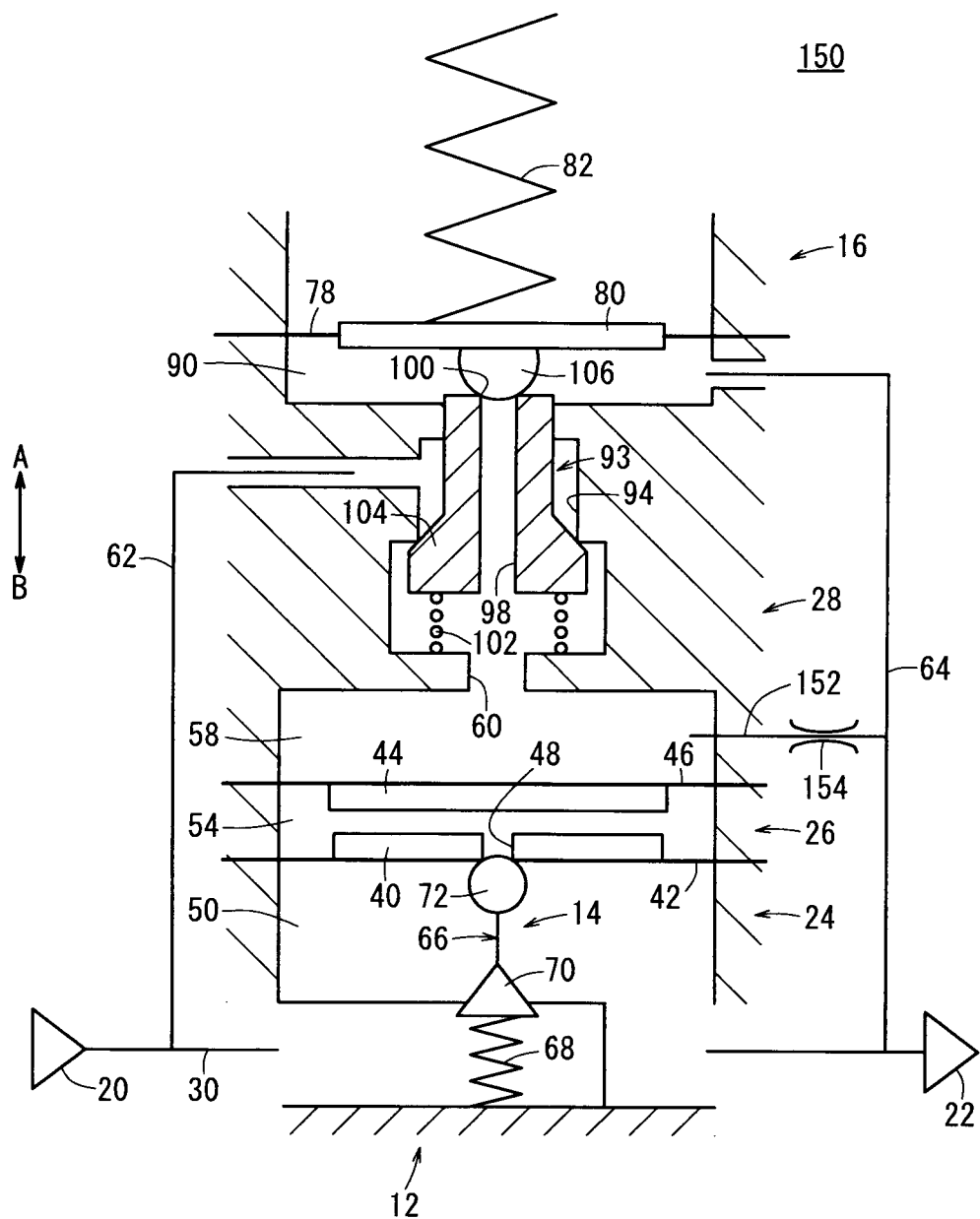
FIG. 4 is a schematic structural view showing the pressure reducing apparatus of FIG. 3.

Next, a pressure reducing apparatus 150 according to a second embodiment is shown in FIGS. 3 and 4. Constituent elements thereof, which are the same as those of the pressure reducing apparatus 10 according to the first embodiment, are designated by the same reference characters, and detailed descriptions of such features are omitted.

The pressure reducing apparatus 150 according to the second embodiment differs from the pressure reducing apparatus 10 according to the first embodiment, in that a branch passage 152 is provided in the body 12, which branches from the feedback passage 64 and connects to the nozzle backpressure chamber 58, and a throttling section 154 is included in the branch passage 152.

The branch passage 152 is formed along a vertical direction in the third body 28 constituting the body 12. A lower end of the branch passage 152 is connected to the nozzle backpressure chamber 58, and an upper end of the branch passage 152 is connected to the feedback passage 64. More specifically, the branch passage 152 communicates mutually via the feedback passage 64 with the nozzle backpressure chamber 58, the second side port 22 and the third diaphragm chamber 90.

Further, a throttling section 154 having a throttling hole 156, which is reduced in diameter from the passage diameter of the branch passage 152, is disposed in the branch passage 152. The throttling hole 156, for example, is formed so as to be gradually reduced in diameter from the nozzle backpressure chamber 58 toward the side of the third diaphragm chamber 90 (in the direction of arrow A).

In this manner, in the body 12, the branch passage 152 is provided that branches from the feedback passage 64 disposed on the second side and communicates with the nozzle backpressure chamber 58, and the throttling section 154, the passage diameter of which is reduced in diameter, is provided in the branch passage 152. By controlling, by means of the pilot valve 93, the flow amount of pressure fluid that is supplied from the first side port 20, through the bypass passage 62 and to the nozzle backpressure chamber 58, with respect to the flow amount of pressure fluid that flows from the nozzle backpressure chamber 58, through the throttling section 154 and to the second side port 22, the pressure in the nozzle backpressure chamber 58 can be controlled with high precision.

As a result, in the pressure reducing apparatus 150, it is possible for the set pressure to be set at a low value, while additionally, since a pressure difference between the nozzle backpressure chamber 58 and the second side port 22 is suppressed, compared to a conventional pressure reducing apparatus, the consumption amount of the pressure fluid can be reduced.

Figure 5:
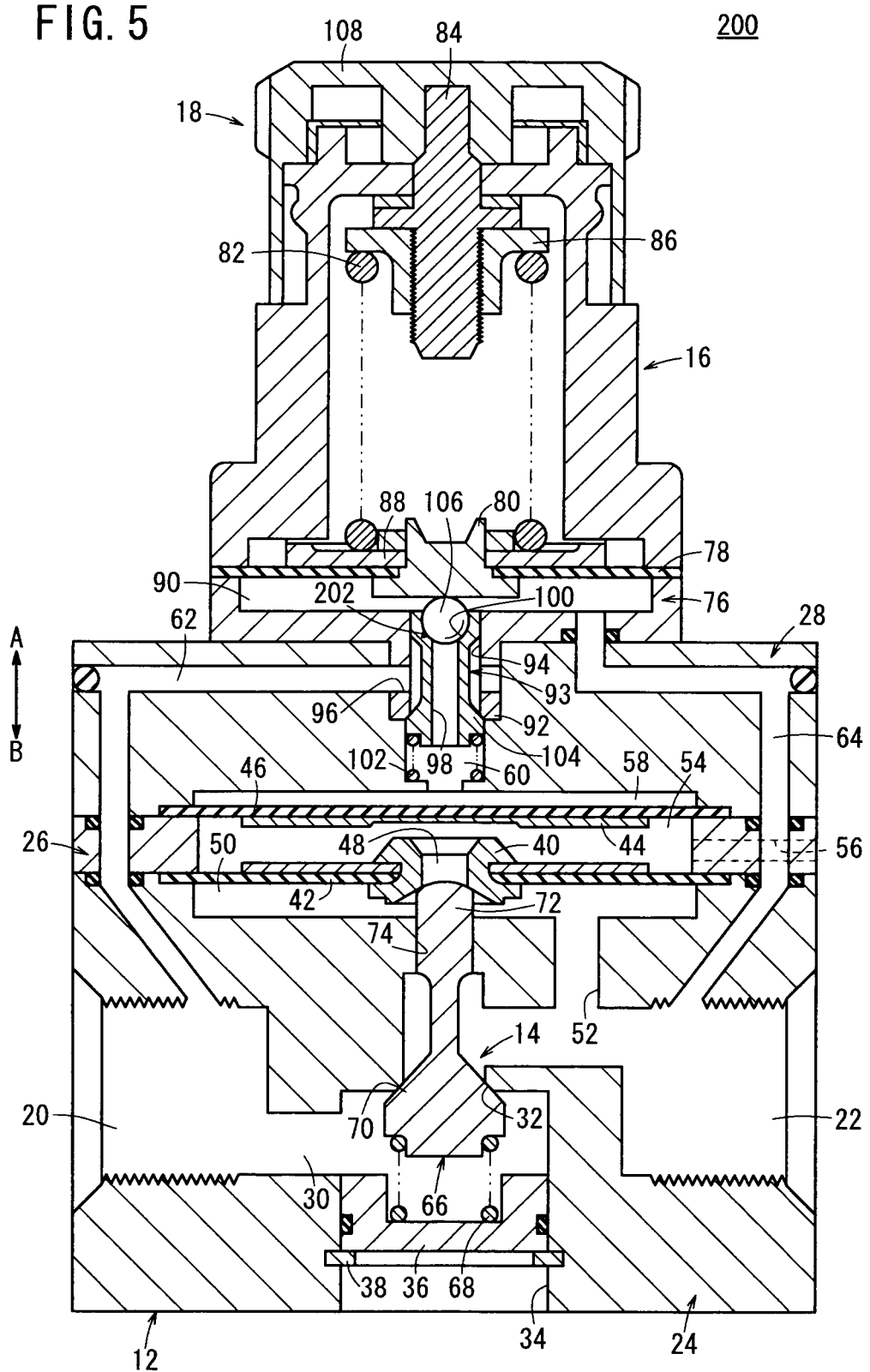
FIG. 5 is an overall cross sectional view of a pressure reducing apparatus according to a third embodiment of the present invention.
Figure 6:
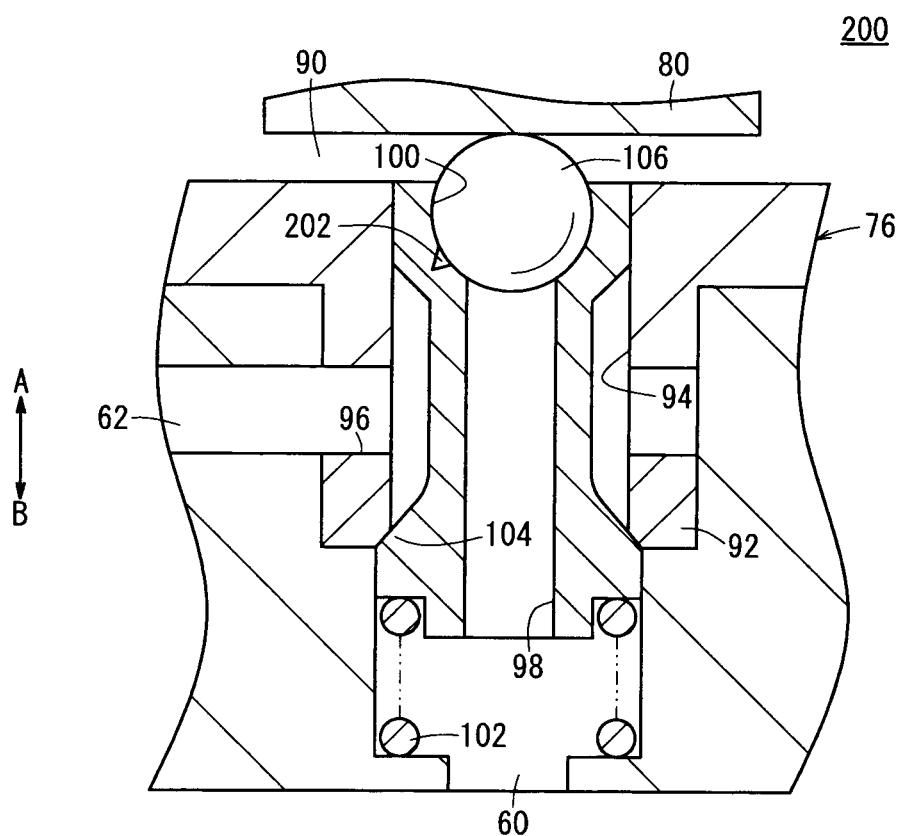
FIG. 6 is an enlarged cross sectional view showing the vicinity of a pilot valve in the pressure reducing apparatus of FIG. 5.
Figure 7:
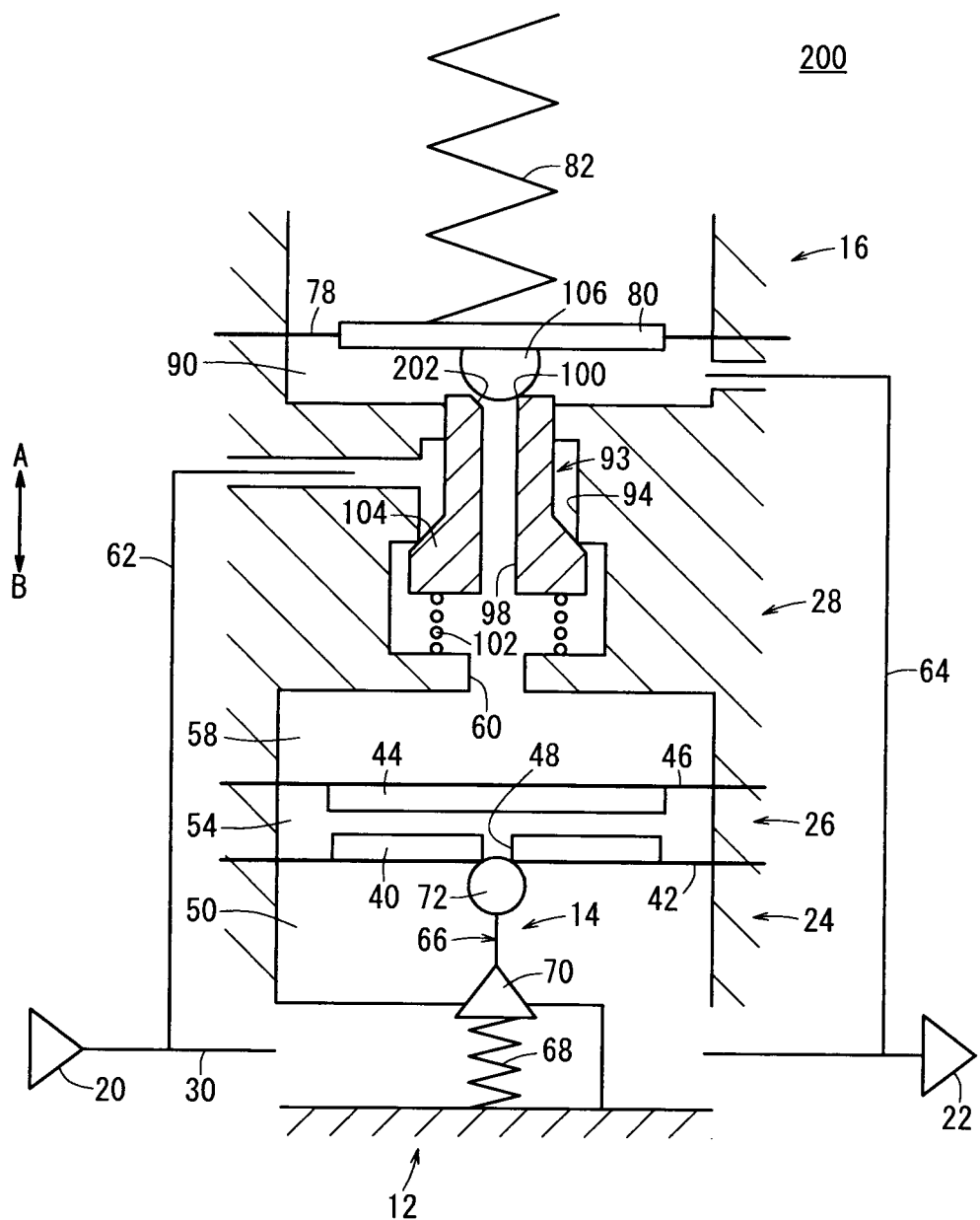
FIG. 7 is a schematic structural view showing the pressure reducing apparatus of FIG. 5.

Next, a pressure reducing apparatus 200 according to a third embodiment is shown in FIGS. 5 through 7. Constituent elements thereof, which are the same as those of the pressure reducing apparatus 10 according to the first embodiment, are designated by the same reference characters, and detailed descriptions of such features are omitted.

The pressure reducing apparatus 200 according to the third embodiment differs from the pressure reducing apparatus 10 according to the first embodiment, in that a cutout groove (groove) 202, which is recessed in a direction away from the spherical body 106, is provided in the valve member 100 of the pilot valve 93.

The cutout groove 202, for example, is formed with a triangular shape in cross section, such that when the spherical body 106 is seated on the valve member 100, communication is maintained between the pilot passage 98 and the third diaphragm chamber 90. Owing thereto, even in the event that the spherical body 106 is seated on the valve member 100 of the pilot valve 93, the nozzle backpressure chamber 58 and the third diaphragm chamber 90 can be placed in communication through the pilot passage 98, and the pressure fluid in the nozzle backpressure chamber 58 is capable of flowing past the third diaphragm chamber 90 to the second side port 22. As a result, by always allowing the pressure fluid to flow from the nozzle backpressure chamber 58 to the second side port 22, control of the second side pressure (set pressure) can be performed with higher precision.

Further, compared to the pressure reducing apparatus 150 according to the second embodiment, since the cutout groove 202 can be provided directly in the valve member 100, the apparatus structure can be simplified without increasing the number of parts. Further, even in the case that the cutout groove 202 becomes clogged with dust or the like, when the spherical body 106 separates from the valve member 100, as a result of the flowing pressure fluid, such dust is blown out from the cutout groove 202, so that clogging thereof can be prevented.

The pressure reducing apparatus according to the present invention is not limited to the above-described embodiments. It is a matter of course that various additional or modified structures could be adopted without deviating from the essence and gist of the present invention.

The invention claimed is:

1. A pressure reducing apparatus having a valve body that controls flow of a pressure fluid introduced from a first side into a backpressure chamber by means of a separating and closing action thereof with respect to a nozzle, and a diaphragm chamber that communicates with the backpressure chamber through a valve member disposed in the valve body, for reducing pressure of the pressure fluid supplied from the first side, to a desired pressure and guiding the pressure fluid out to a second side, comprising:
   the valve body, which is disposed between the backpressure chamber and the diaphragm chamber, the valve body being disposed displaceably with respect to the nozzle;
   a first connection passage that connects the first side and the backpressure chamber, and in which a communication state is switched by the valve body; and
   a second connection passage that communicates between the second side and the diaphragm chamber,
   wherein a flapper of the valve body is disposed on a fluid-supply side of the backpressure chamber, the first connection passage is connected to the fluid-supply side, and the backpressure chamber communicates with the second side via the second connection passage, and
   wherein the valve body is disposed displaceably along an axial direction in an interior portion of the nozzle, and in an interior portion of the valve body, a pilot passage is formed that penetrates along the axial direction, communication being established through the pilot passage between the backpressure chamber and the diaphragm chamber.

2. The pressure reducing apparatus according to claim 1, wherein a throttling section is disposed on a downstream side of the backpressure chamber for throttling a flow amount of the pressure fluid that flows from the backpressure chamber into the second connection passage.

3. The pressure reducing apparatus according to claim 1, further comprising a branch passage that connects the second connection passage and the backpressure chamber, and wherein a throttling section is disposed in the branch passage for throttling a flow amount of the pressure fluid that flows from the backpressure chamber into the second connection passage.

4. The pressure reducing apparatus according to claim 1, wherein the valve body includes a groove through which a portion of the pressure fluid flows through the nozzle and between the backpressure chamber and the diaphragm chamber, when the nozzle is closed by the flapper.

5. The pressure reducing apparatus according to claim 4, wherein the groove is formed in the valve member, and is recessed in a direction away from a spherical body, which is seated in the valve member.

6. The pressure reducing apparatus according to claim 5, wherein the groove is formed with a triangular shape in cross section.

\* \* \* \* \*